(No Model.)
A. S. CARTER.
BICYCLE TOOL BOX.
No. 514,542. Patented Feb. 13, 1894.
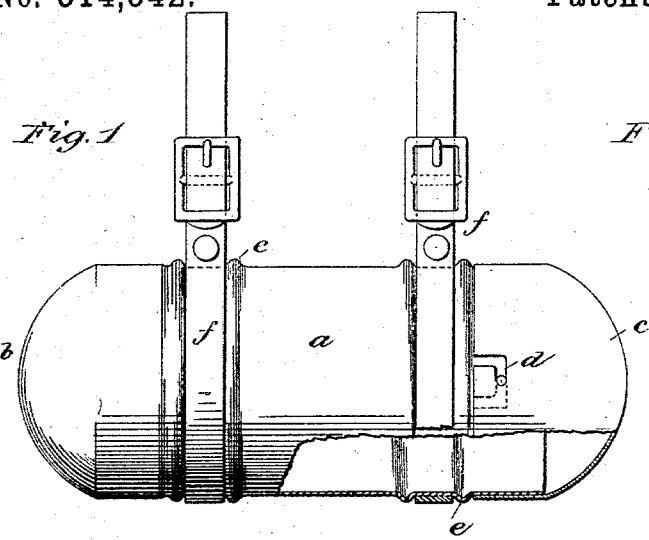
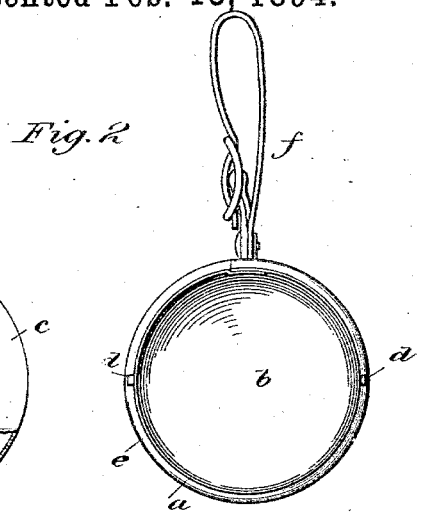
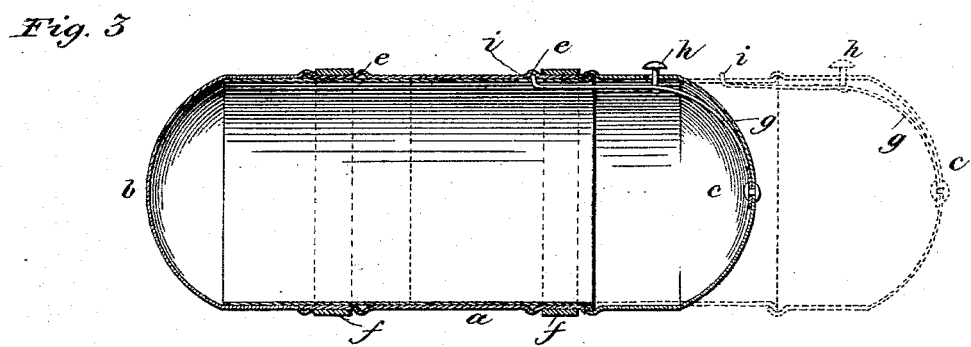
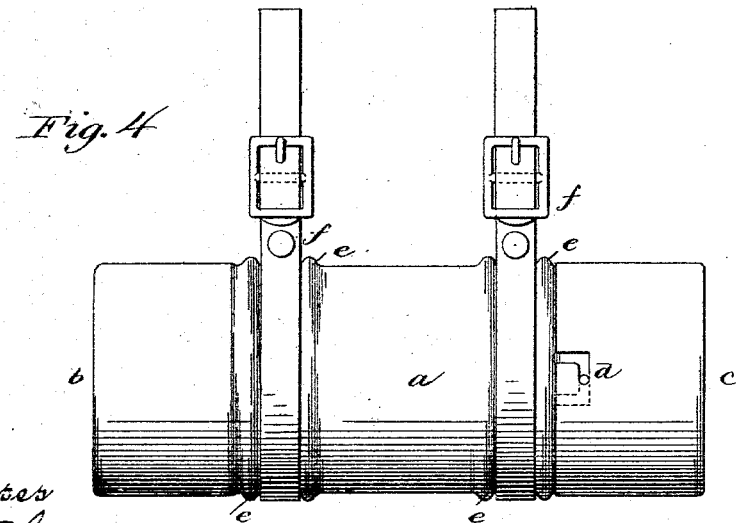
Witnesses:
J. T. Coleman
E. A. Grinnell
Inventor
Albert S. Carter,
by Wm. T. Grinnell
his Atty.
THE NATIONAL LITHOGRAPHING COMPANY,
WASHINGTON, D. C.

UNITED STATES PATENT OFFICE.

ALBERT S. CARTER, OF PHILADELPHIA, PENNSYLVANIA, ASSIGNOR OF ONE-HALF TO SPENCER D. WRIGHT, OF SAME PLACE.

BICYCLE TOOL-BOX.

SPECIFICATION forming part of Letters Patent No. 514,542, dated February 13, 1894.

Application filed February 14, 1893. Serial No. 462,264. (No model.)

*To all whom it may concern:*

Be it known that I, ALBERT S. CARTER, a citizen of the United States, residing at Philadelphia, in the county of Philadelphia and State of Pennsylvania, have invented a certain new and useful Improvement in Bicyclers' Tool-Boxes, of which the following is a full, clear, and exact description.

The object of this invention is to provide a box or holder for use on bicycles for containing the necessary tools usually required by a bicycler; and in the production of my invention I have had especially in view the purpose of making a light-weight and strong and durable box and especially one not easily crushed and battered.

In carrying out my invention, I have made a cylindrical box of metal, composed of a body having a removable telescoping cover, and an interlocking fastening device permanently applied to the box, to connect the body and cover, the said body being provided with pairs of strap-receiving projections, substantially as hereinafter more particularly set forth and finally claimed.

In the accompanying drawings illustrating my invention, in the several figures of which like parts are similarly designated, Figure 1 is a side elevation with the lower right hand portion broken away, and in section. Fig. 2 is an end view with the cap detached. Fig. 3 is a longitudinal section showing a modification, and Fig. 4 is a side elevation of another modification.

In the preferred form of my invention, I employ a cylindrical box $a$ having a hemispherical or rounded end $b$ fixed to the body $a$, and also having a removable rounded end $c$ which may be connected with the body $a$ by any suitable locking means, as, for instance, opposite bayonet joints $d$. The body of the box is made with pairs of parallel circumferential beads or ribs $e$, which form seats or guides for the straps $f$, by which the box is attached to a machine, or, carried if desired.

The box may be composed of telescopic sections, as shown in Fig. 3, where $a$ is the body proper and $e$ the removable end, whose cylindrical portion is continued sufficiently to extend the whole or nearly the whole length of the body $a$. In making the box in this manner, it may be composed of several sections seamed together, substantially as indicated in the said figure. I have shown by dotted lines at the right side of the said figure the cover withdrawn in order the more clearly to show its detachability and telescopic character. It will be observed, also, that inasmuch as the detachable cover in this form of the device is practically as long as the box itself, the tools may be withdrawn from the box along with the cover. I have also shown in connection with Fig. 3 another form of connecting or locking mechanism, the same consisting of a spring $g$ riveted to the head of the cap or cover and provided with an operating push-button $h$ and terminating in the hooked end $i$, which engages one of the ribs or beads $e$ to connect the said box and cover.

Instead of making the ends of the box curved or hemispherical, they may be made flat or square, as shown in Fig. 4.

The box thus constructed is made of thin sheet metal and may be lacquered or otherwise protected against atmospheric influences, and will be found very serviceable and an economical and durable article for the use of bicyclers or others. Hard rubber, celluloid and other rigid material may be employed as well as metal.

What I claim is—

As an improved article of manufacture, the tool box for bicyclers and others, composed of a cylindrical metallic body with pairs of externally-projecting parallel circumferential beads or ribs to receive straps by which the box may be supported in position, a detachable telescoping cover, and a permanently applied interlocking fastening device to connect the body and cover, substantially as described.

In testimony whereof I have hereunto set my hand this 30th day of January, A. D. 1893.

ALBERT S. CARTER.

Witnesses:
JOSEPH ROHRER,
EDWARD J. MAGUIGAN.